July 27, 1937.     K. RABE     2,088,342
SPRINGING MEANS FOR VEHICLES OR THE LIKE
Original Filed July 26, 1935
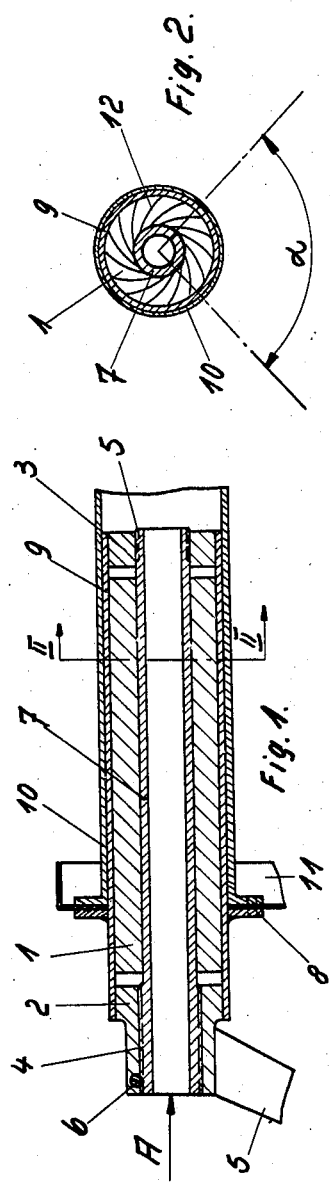
INVENTOR
KARL RABE
BY
ATTORNEY Patented July 27, 1937

2,088,342

UNITED STATES PATENT OFFICE 2,088,342

SPRINGING MEANS FOR VEHICLES OR THE LIKE

Karl Rabe, Stuttgart, Germany

Original application July 26, 1935, Serial No. 737,099. Divided and this application June 27, 1936, Serial No. 87,647. In Germany July 13, 1933

12 Claims. (Cl. 267—21)

This invention relates to improvements in springing means for vehicles or the like, and is a division of my copending application S. N. 737,099, filed July 26, 1935, entitled "Springing arrangements for motor cars and the like."

An object of my invention is the provision of springing means for vehicles which are an improvement over those now known and utilized in the art.

A further object of my invention is the provision of improved springing means for vehicles using an elastic material, such as rubber, as the springing means.

Another object of my invention is the provision of improved springing means for vehicles which includes inherent damping action.

Still another object of my invention is the provision of unitary compact springing means for the wheels of a vehicle, which may be readily renewed or replaced as a unit.

Other objects will appear from the following description of an illustrative embodiment of the invention taken together with the attached drawing, wherein:

Fig. 1 is a horizontal sectional view of a springing means formed according to the invention; and Fig. 2 is a cross-sectional view along the lines II—II of Fig. 1.

In the constructional example of my invention illustrated in the drawing, a hollow cylindrical tube 1 of rubber or other suitable elastic material is inserted between a shaft member 7 and a concentric tubular member 9. To one end of the shaft member 7 is attached a trunnion 2 of an arm 5 which, in turn, may act as the wheel supporting means of a vehicle. At the opposite end of the shaft 7 is attached a disc-like member 3. By means of the members 2 and 3 the shaft 7 is therefore independently journaled within the concentric tube 9. The means of attachment of members 2 and 3 to shaft 7 is of no particular importance. They are shown, however, as connected by means of a profiled surface on the shaft inter-engaging corresponding profiles on the members 2 and 3. Key members 5 and 6 may be provided to guard against axial displacement.

The hollow rubber member 1 is preferably inserted between the shaft 7 and tubular member 9 by pressing the same in between with a twist, so that the final relative position of the rubber member 1 with relation to shaft 7 and tubular member 9 is that illustrated in Fig. 2, wherein the arches 12 illustrate the distorted position of the rubber. It will be thus seen that the rubber is given an initial tangential stress; the twisted position of the rubber will be maintained while there is no load upon the lever arm 5, due to the fact that the rubber as twisted will be confined by the surrounding tubular member 9. Movement of the arm in one direction or another will therefore tend to increase or decrease the twist and therefore similarly change the initial normal tangential stress.

The hollow member 9 is preferably positioned within a hollow frame member 10 and is rigidly attached to the main frame by some such suitable means as a flange 8.

Upon movement of the arm 5, due to vertical movement of the wheel, force is transmitted so as to tend to rotate the shaft member 7. Due to the frictional engagement between the shaft member 7 and the rubber tube 1, the arcs 12, which are illustrative of the tangential forces present in the twisted rubber, will be either lengthened or shortened corresponding to the direction of twist.

The angle of swing of the shaft member 7 shown in Fig. 2 as α is so selected that the frictional contact between the rubber member 1 and the shaft 7 and tubular member 9 is not exceeded. Accordingly, the twisting of rubber member 1 acts as the springing means for the wheel attached at the end of arm 5.

The improved structure described above has the advantage that it not only provides adequate springing for the wheels of a vehicle but also due to the initial twist given the elastic material it is self damping, and by the use of such a structure special additional damping means are not required, as contrasted with constructions which have been heretofore proposed.

As a rule, it will not be necessary to secure the shaft member 7 and the members 2 and 3 with respect to the sleeve 9, as any lateral pressure A which may occur upon the shaft member 8 is readily absorbed by the adhesion forces of the rubber member 1.

By means of my improved construction it will readily be seen that the rubber member 1 is subject only to the torsional forces imposed thereupon. Any other forces, with the exception of the lateral force A, will be taken care of by the journaling of shaft 7 in tubular member 9 by the members 2 and 3. No bending of the rubber due, for example, to the vehicle load, can take place and by thus conserving the properties of the elastic material for springing function only, the same will give greater service with less wear and breakdown.

The members 2 and 3 also perform a second function. Since they necessarily form a tight fit in the tubular member 9, they act to keep dirt and water from coming in contact with the elastic material. The latter is accordingly totally enclosed and its life is therefore materially increased.

Attention is directed to the fact that my improved springing means is so constructed that it may readily be taken out and replaced as a unit. This is obviously of great importance, where due to wear, consequent replacement may become necessary.

The invention is not restricted to the details of the form described and illustrated. The arm 5 may be replaced by any suitable means such, for example, as a parallelogram. It is not necessary that the springing arrangement be placed transversely of the frame, but, if desired, may be positioned at any angle thereto and, in fact, may be longitudinal to the frame with the swinging half-axle and the wheel thereon describing an arc.

The term "frame" as herein used, is not to be understood as limited to such a device when formed separate from the body or coach work of the vehicle, but including such device when formed as a part of or intimately interconnected with the body or coach work of the vehicle.

It will be seen that I have provided a construction which satisfies the objects enumerated above and one which constitutes the valuable advance in the art. While I have shown the invention in a certain physical embodiment, it is to be understood that modifications of the structure shown may be made by those skilled in this art without departing from my invention as expressed in the following claims.

I claim:

1. A unitary replaceable spring unit for vehicles and the like, comprising an inner cylindrical member, an outer tubular member, and a normally tangentially stressed tubular elastic member located between and frictionally engaging each of said inner and outer members.

2. The combination according to claim 1, in which said elastic member is made of rubber.

3. In a vehicle having a frame and a wheel, in combination, means for supporting said wheel relative to said frame, including a unitary replaceable spring unit, comprising an inner cylindrical member, an outer tubular member, and a normally tangentially stressed tubular elastic member located between and frictionally engaging each of said inner and outer members.

4. A combination according to claim 3 in which said elastic member is made of rubber.

5. Wheel springing and supporting means for vehicles having a frame comprising a normally tangentially stressed tubular rubber member, and means for connecting the inner portion of said tubular member to said wheel, and means for connecting the outer portion to said frame.

6. A unitary replaceable spring unit for vehicles and the like, comprising an inner cylindrical member, an outer tubular member, a normally stressed tubular elastic member located between and frictionally engaging each of said inner and outer members, and wheel supporting means attached to said inner cylindrical member and journaled in said outer tubular member.

7. A unitary replaceable spring unit for vehicles and the like, comprising an inner cylindrical member, an outer tubular member, a normally stressed tubular elastic member located between and frictionally engaging each of said inner and outer members, and means at opposite ends of said inner cylindrical member for journaling the same in said outer tubular member.

8. A unitary replaceable spring unit for vehicles and the like, comprising an inner cylindrical member, an outer tubular member, a normally stressed tubular elastic member located between and frictionally engaging each of said inner and outer members, means at one end of said inner cylindrical member for journaling the same in said outer tubular member and forming a wheel supporting member, and means at the other end of said inner cylindrical member for journaling the same in said outer tubular member.

9. In a vehicle having a frame and a wheel, in combination, means for supporting said wheel relative to said frame, comprising an inner cylindrical member, an outer tubular member, and a normally tangentially stressed tubular elastic member located between and frictionally engaging each of said inner and outer members.

10. The combination according to claim 9 including means at opposite ends of said inner cylindrical member for journaling the same in said outer tubular member.

11. The combination according to claim 5 including means for journaling said first means within said second means.

12. In a vehicle, in combination, a frame including a hollow tubular member, wheel supporting means comprising an outer tubular member positioned within and attached to said hollow tubular frame member, an inner cylindrical member, means at opposite ends of said inner cylindrical member for journaling the same in said outer tubular member, and a normally stressed tubular elastic member located between and frictionally engaging each of said inner and outer members.

KARL RABE.